(12) United States Patent
Rothberg et al.

(10) Patent No.: US 7,406,545 B1
(45) Date of Patent: Jul. 29, 2008

(54) DISK DRIVE OR ANY SERIAL ATTACHED DEVICE LOGGING A CABLE LOSS EVENT

(75) Inventors: Michael S. Rothberg, Foothill Ranch, CA (US); Donald L. McKeefery, Ladera Ranch, CA (US); Anthony C. Geria, Mission Viejo, CA (US); Jan G. Abrahamsson, San Clemente, CA (US); Andrew Hill, Costa Mesa, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 283 days.

(21) Appl. No.: 11/255,435

(22) Filed: Oct. 20, 2005

(51) Int. Cl.
*G06F 3/00* (2006.01)
*G06F 11/00* (2006.01)

(52) U.S. Cl. .......................... 710/15; 324/543; 714/56; 713/320

(58) Field of Classification Search ............ 710/15–19, 710/38; 713/300, 320; 714/56–57; 324/763–764, 324/542–543
See application file for complete search history.

(56) References Cited

U.S. PATENT DOCUMENTS

| | | | | |
|---|---|---|---|---|
| 4,620,282 A | * | 10/1986 | Shelley | 716/4 |
| 4,807,160 A | * | 2/1989 | Nozaki | 702/58 |
| 5,461,661 A | | 10/1995 | Buttle | |
| 5,680,405 A | * | 10/1997 | Pesetski et al. | 714/713 |
| 5,812,751 A | * | 9/1998 | Ekrot et al. | 714/4 |
| 5,938,742 A | | 8/1999 | Faddell et al. | |
| 6,229,538 B1 | * | 5/2001 | McIntyre et al. | 715/734 |
| 6,230,109 B1 | * | 5/2001 | Miskimins et al. | 702/109 |
| 6,381,011 B1 | * | 4/2002 | Nickelsberg et al. | 356/73.1 |
| 6,397,347 B1 | | 5/2002 | Masuyama et al. | |
| 6,594,721 B1 | | 7/2003 | Sakarda et al. | |
| 6,600,614 B2 | | 7/2003 | Lenny et al. | |
| 6,820,225 B1 | * | 11/2004 | Johnson et al. | 714/715 |
| 7,155,653 B2 | * | 12/2006 | Monnerat | 714/742 |
| 2002/0191537 A1 | | 12/2002 | Suenaga | |
| 2005/0102567 A1 | * | 5/2005 | McGuire et al. | 714/25 |
| 2006/0061369 A1 | * | 3/2006 | Marks et al. | 324/542 |

OTHER PUBLICATIONS

"Serial ATA: High Speed Serialized AT Attachment", http://www.serialata.org, Jan. 7, 2003, Revision 1.0a, pp. 92-95, 112, 117, 124-128, 157-158, 163-164, 170-171, 181-183.

* cited by examiner

*Primary Examiner*—Christopher B. Shin
(74) *Attorney, Agent, or Firm*—Howard H. Sheerin, Esq.

(57) ABSTRACT

An information storage device is disclosed (such as a disk drive) comprising an interface for connecting to a host through a cable, and control circuitry for communicating with the host over the cable by executing a communication process. The communication processes comprises the steps of transmitting a communication request to the host over the cable and waiting to receive a response from the host over the cable. A cable loss event is logged if the host fails to respond after executing the communication process at least twice. Performing the communication process multiple times before logging a cable loss event helps ensure a communication failure is actually due to a faulty cable connection.

27 Claims, 4 Drawing Sheets

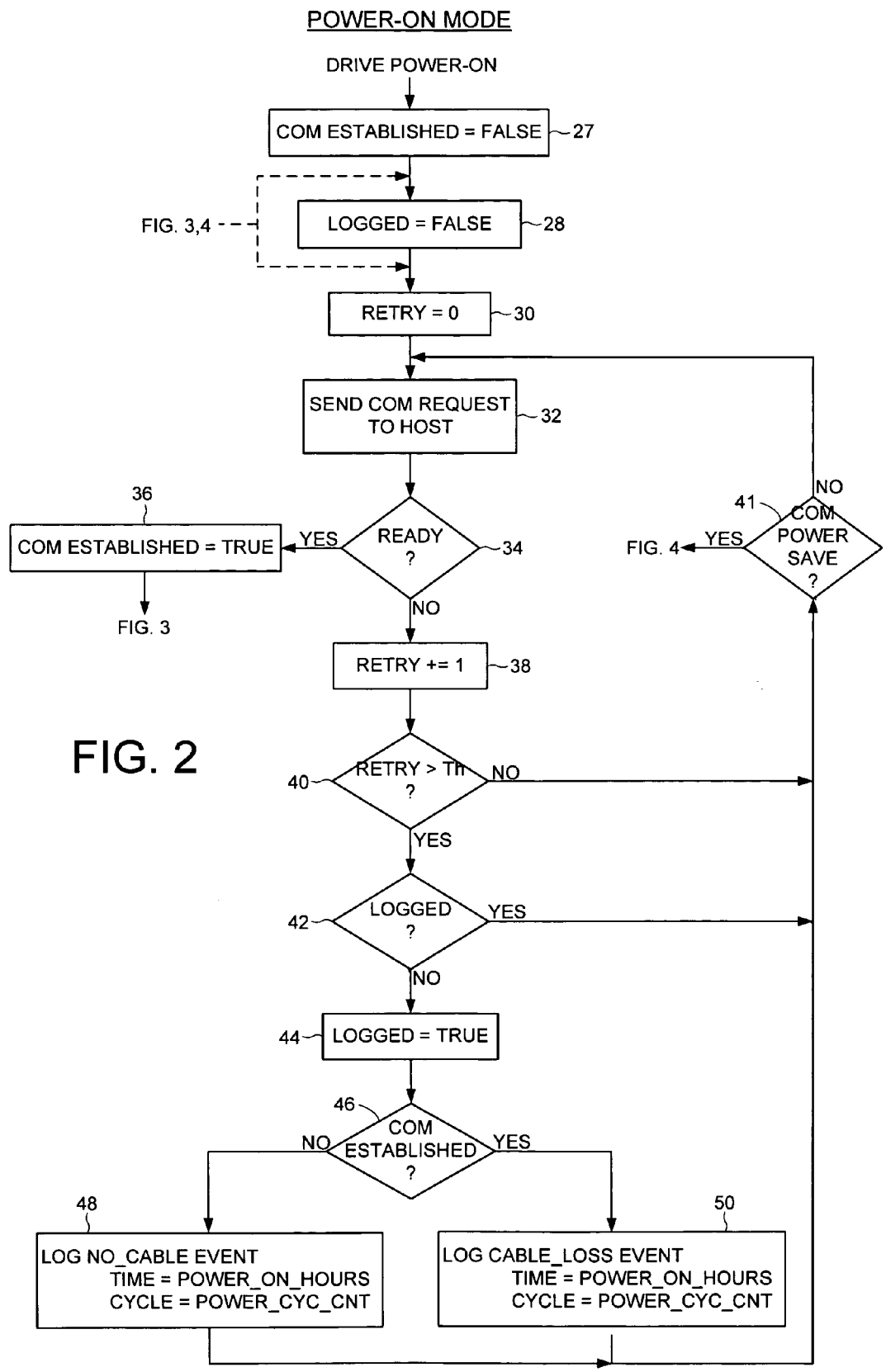

DISK DRIVE OR ANY SERIAL ATTACHED DEVICE LOGGING A CABLE LOSS EVENT

BACKGROUND OF THE INVENTION

1. Field of the Invention

The present invention relates to information storage devices for computer systems. More particularly, the present invention relates to an information storage device capable of logging a cable loss event.

2. Description of the Prior Art

When an information storage device, such as a disk drive, fails while in the field, it is typically returned to the manufacturer where it is analyzed to determine what caused the failure. This information is useful in correcting flaws in manufacturing so as to increase manufacturing yield and reliability. A returned disk drive is typically evaluated by connecting it to a test station that runs a number of diagnostic procedures. In addition, the disk drive itself may maintain an error log while in the field in order to save operational information that may be useful in diagnosing defects in a disk drive after it has been returned to the manufacturer.

Many times a failed disk drive returned to the manufacturer is found to have no defects; that is, the disk drive will operate normally when connected to the test station. It is suspected that many of these failures are caused by a bad cable connection between the disk drive and the host while in the field. That is, the cable itself may be defective or may come loose while operating in the field, leading to an assumption that the disk drive is defective. When the disk drive is returned to the manufacturer and connected to the test station using a reliable cable (and reliable connection), the disk drive operates normally.

There is, therefore, a need for an information storage device that detects and logs cable loss events to help manufacturers rule-out a bad cable connection as the root cause of the storage device being returned.

SUMMARY OF THE INVENTION

An embodiment of the present invention comprises a disk drive including a disk and a head actuated over the disk. The disk drive further comprises an interface for connecting to a host through a cable, and control circuitry for communicating with the host over the cable by executing a communication process. The communication processes comprises the steps of transmitting a communication request to the host over the cable and waiting to receive a response from the host over the cable. A cable loss event is logged if the host fails to respond after executing the communication process at least twice.

In one embodiment, the cable is a serial advanced technology attachment (SATA) cable.

In another embodiment, the control circuitry periodically executes the communication process.

In yet another embodiment, the control circuitry enters a communication power save mode, awakens from the communication power save mode to execute the communication process, and re-enters the communication power save mode.

In one embodiment, the cable loss event comprises a cumulative operating time of the disk drive, and in another embodiment, the cable loss event comprises a power cycle count of the disk drive.

In still another embodiment, the control circuitry is further operable to store a plurality of cable loss events in an event log saved in a non-volatile memory, wherein in one embodiment, the non-volatile memory comprises the disk.

Another embodiment of the present invention comprises a method of operating disk drive device coupled to a host through a cable, wherein the disk drive comprises a disk and a head actuated over the disk. The method comprises the steps of attempting to communicate with the host over the cable by executing a communication process comprising the steps of transmitting a communication request to the host over the cable and waiting to receive a response from the host over the cable, wherein a cable loss event is logged if the host fails to respond after executing the communication process at least twice.

Another embodiment of the present invention comprises a serial attached device comprising an interface for connecting to a host through a serial cable. The serial attached device further comprises control circuitry for communicating with the host over the serial cable by executing a communication process comprising the steps of transmitting a communication request to the host over the cable and waiting to receive a response from the host over the cable. A cable loss event is logged if the host fails to respond after executing the communication process at least twice.

BRIEF DESCRIPTION OF THE DRAWINGS

FIG. 2 is a flow diagram illustrating how a cable loss event may be logged during a power on mode according to an embodiment of the present invention.

DESCRIPTION OF THE PREFERRED EMBODIMENTS

Figure 1A:
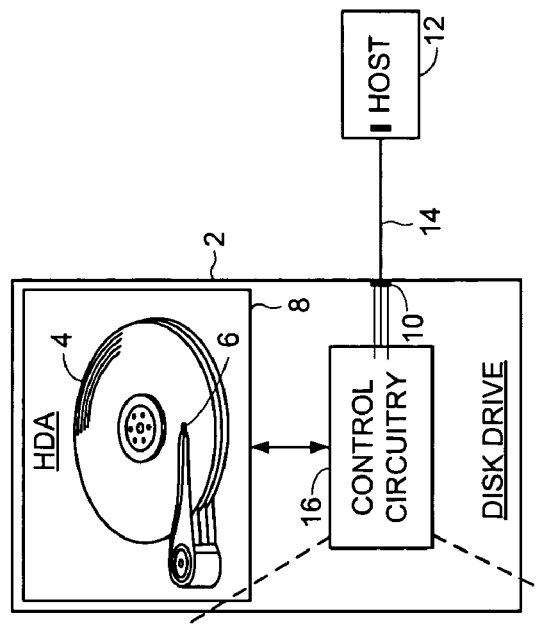
FIG. 1A shows a disk drive according to an embodiment of the present invention comprising a disk, a head actuated over the disk, a cable connected to a host, and control circuitry for logging a cable loss event.

FIG. 1A shows an information storage device (a disk drive 2 in this example) according to an embodiment of the present invention. The disk drive 2 comprises a disk 4 and a head 6 actuated over the disk 4 enclosed in a head disk assembly (HDA) 8. The disk drive 2 further comprises an interface 10 for connecting to a host 12 through a cable 14, and control circuitry 16 for communicating with the host 12 over the cable 14 by executing a communication process. The communication process comprises the steps of transmitting a communication request to the host 12 over the cable 14 and waiting to receive a response from the host 12 over the cable 14. A cable loss event is logged if the host 12 fails to respond after executing the communication process at least twice.

Figure 1B:
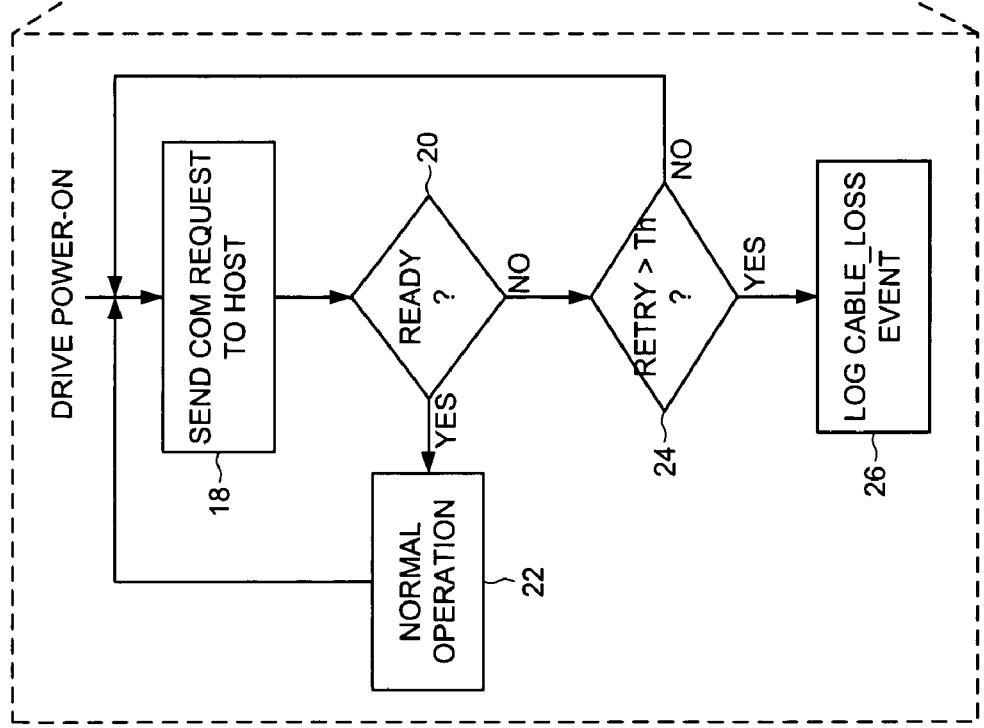
FIG. 1B is a flow diagram according to an embodiment of the present invention wherein a cable loss event is logged if a communication process fails at least twice.

FIG. 1B is a flow diagram executed by the control circuitry 16, illustrating the cable loss detection procedure according to an embodiment of the present invention. At step 18 the control circuitry 16 transmits a communication request to the host 12. If at step 20 the host 12 responds to the communication request with a ready status, then at step 22 the disk drive enters a normal operating mode. If at step 20 the host does not respond with a ready status, and at step 24 a retry counter is less than a predetermined threshold, then the control circuitry 16 retransmits the communication request to the host 12 and again waits for a response. If at step 24 the retry counter exceeds the threshold, meaning that the communication process has failed at least twice, then at step 26 the control circuitry 16 logs a cable loss event.

Any suitable control circuitry 16 may be employed to implement the embodiments of the present invention. In one embodiment, the control circuitry 16 comprises a microprocessor executing instructions, the instructions being operable to cause the microprocessor to perform the steps of FIG. 1B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 4 and read into a volatile semiconductor memory when the disk drive is powered on. In yet another embodiment, the control circuitry 16 comprises suitable logic circuitry, such as state machine circuitry.

As would be well understood by those of skill in the art, embodiments of the present invention may be implemented in any suitable information storage device, including magneto-optical disk drives, optical disk drives (CD-ROMs, DVD-ROMs, etc.), tape drives, flash memory, etc. In addition, any suitable cable 14 and corresponding communication protocol may be employed in the embodiments of the present invention. In one embodiment, the cable 14 and corresponding communication protocol operate according to the serial advanced technology attachment (SATA) protocol. The specification (e.g., version 1.0a) for the SATA protocol is available on the Internet at http://www.serialata.org and is incorporated herein by reference. Any other suitable serial communication protocol may be employed in the embodiments of the present invention, such as the serial attached SCSI (SAS) protocol. In addition, any suitable parallel communication protocol may be employed, such as parallel ATA, parallel SCSI, parallel Fibre Channel, etc.

FIG. 2 is a flow diagram for detecting a cable loss event during a power on mode according to an embodiment of the present invention. After the disk drive 2 is powered on, at step 27 a com established flag is initialized to false to indicate that communication has not yet been established with the host 12. At step 28 a LOGGED flag is initialized to false to indicate that a cable loss event has not yet been logged for the current power on cycle. At step 30 a RETRY counter is initialized to zero, and at step 32 a communication request is transmitted to the host 12. In the SATA protocol, the communication request comprises a COMINIT command transmitted to the host 12. If at step 34 the cable 14 is securely connected and the host 12 receives the communication request, the host responds with a ready status (e.g., with a COMWAKE command in the SATA protocol). At step 36 the com established flag is set to true indicating that communication has been established, and the disk drive 2 transitions into the normal operating mode flow diagram of FIG. 3.

If at step 34 the host 12 does not respond with a ready status, then at step 38 the RETRY counter is incremented. If at step 40 the RETRY counter is less than a predetermined threshold, and at step 41 the disk drive is not put into a communication power save mode, then the communication process is repeated starting at step 32. If at step 40 the RETRY counter exceeds the threshold (meaning the communication process has failed at least twice), then it is assumed that the failure to communicate is due to a cable loss event. If at step 42 a cable loss event has not been logged (LOGGED is false), then at step 44 the LOGGED flag is set to true. If at step 46 the com established flag is false (indicating that communication has not yet been established with the host 12), then it is assumed that the cable 14 is not present and at step 48 a NO_CABLE event is logged. If at step 46 com established is true (indicating that communication had been established with the host 12), then it is assumed that the cable 14 was present and operating but then disconnected, and therefore at step 50 a CABLE_LOSS event is logged.

In one embodiment, when a NO_CABLE event or CABLE_LOSS event is logged, a cumulative operating time of the disk drive is also logged with the event. The cumulative operating time indicates the total hours that the disk drive has been powered on over the life of the disk drive. In another embodiment, a power cycle count of the disk drive is logged indicating the total number of power on cycles over the life of the disk drive at the time the NO_CABLE or CABLE_LOSS event occurred. This information may be helpful in diagnosing the nature of the cable connection failure. For example, if a number of cable loss events are logged sporadically over the life of the disk drive, it may be assumed that the cable or cable connections are defective. If, however, a number of cable loss events are logged only after a long cumulative operating time and after a number of successful power on cycles, it may be assumed that the cable 14 came loose due to an external event, such as a physical shock to the computer system, a repair of the computer system, or relocating the disk drive to a different computer system wherein the cable 14 was not connected securely.

Figure 3:
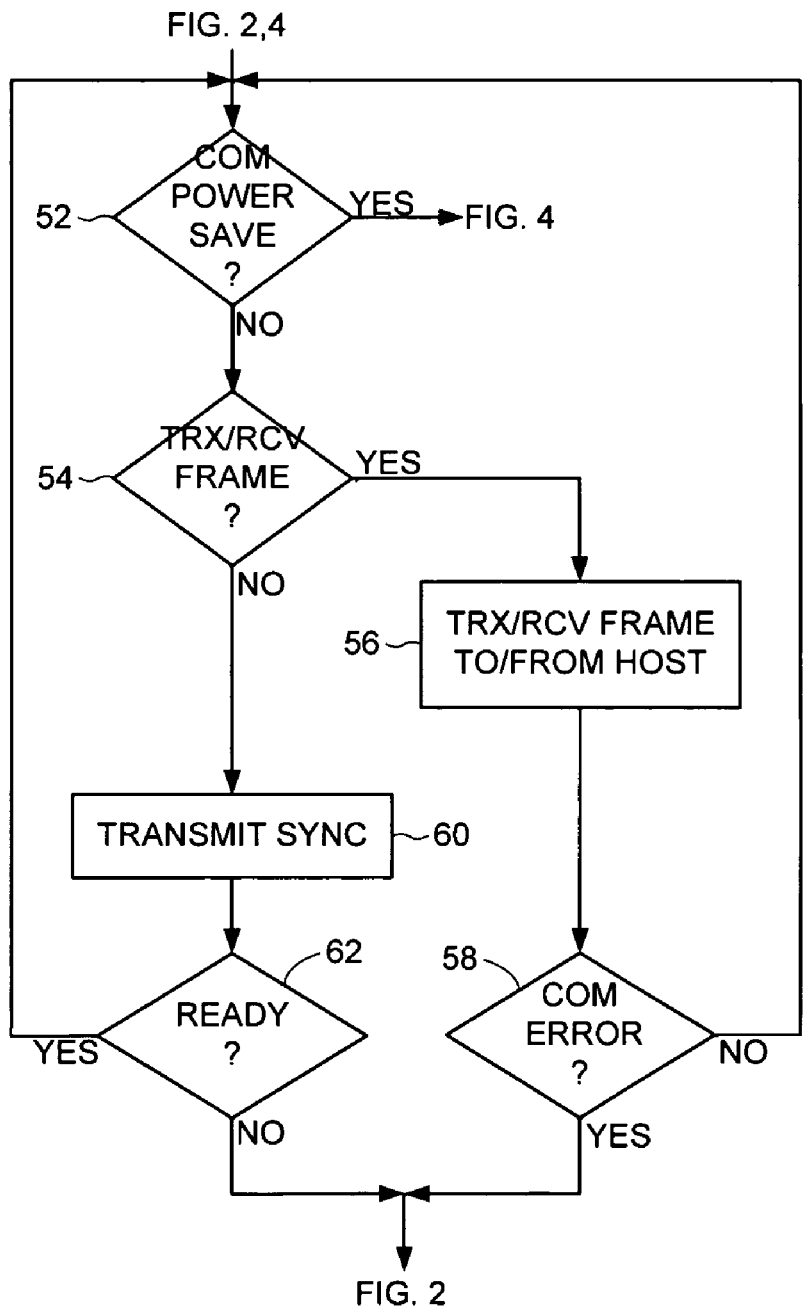
FIG. 3 is a flow diagram illustrating how a cable loss event may be logged during normal operation according to an embodiment of the present invention.

FIG. 3 is a flow diagram illustrating a normal operating mode of the disk drive 2 after successfully establishing communication with the host 12 according to an embodiment of the present invention. At step 52 the disk drive may be put into a communication power saving mode either by the host 12 or by the control circuitry 16 internally. For example, if either the host 12 or the control circuitry 16 detects a long interval since the last disk access command has been transmitted by the host 12, either the host 12 or the control circuitry 16 may initiate a communication power saving request wherein the communication circuitry (e.g., the physical layer of SATA) is powered down into a power saving mode. If at step 52 the disk drive is not in the communication power saving mode, and at step 54 there is a pending request to either receive a frame of data from the host or transmit a frame of data to the host 12 in connection with a disk access command, then at step 56 the data is transmitted between the host 12 and disk drive 2. If at step 58 a communication error is detected during the transmission of the frame, then control proceeds to step 28 or 30 of FIG. 2 in order to detect whether a cable loss event has occurred. If at step 54 there are no pending requests to transmit a frame between the host 12 and disk drive 2, then at step 60 the control circuitry 16 transmits a sync request to the host 12. If at step 62 a ready status is not received from the host 12, then control proceeds to step 28 or 30 of FIG. 2 in order to detect whether a cable loss event has occurred. In this embodiment, the control circuitry 16 is able to periodically check whether the cable 14 has become disconnected even if there are no disk access commands being serviced by the disk drive 2.

Figure 4:
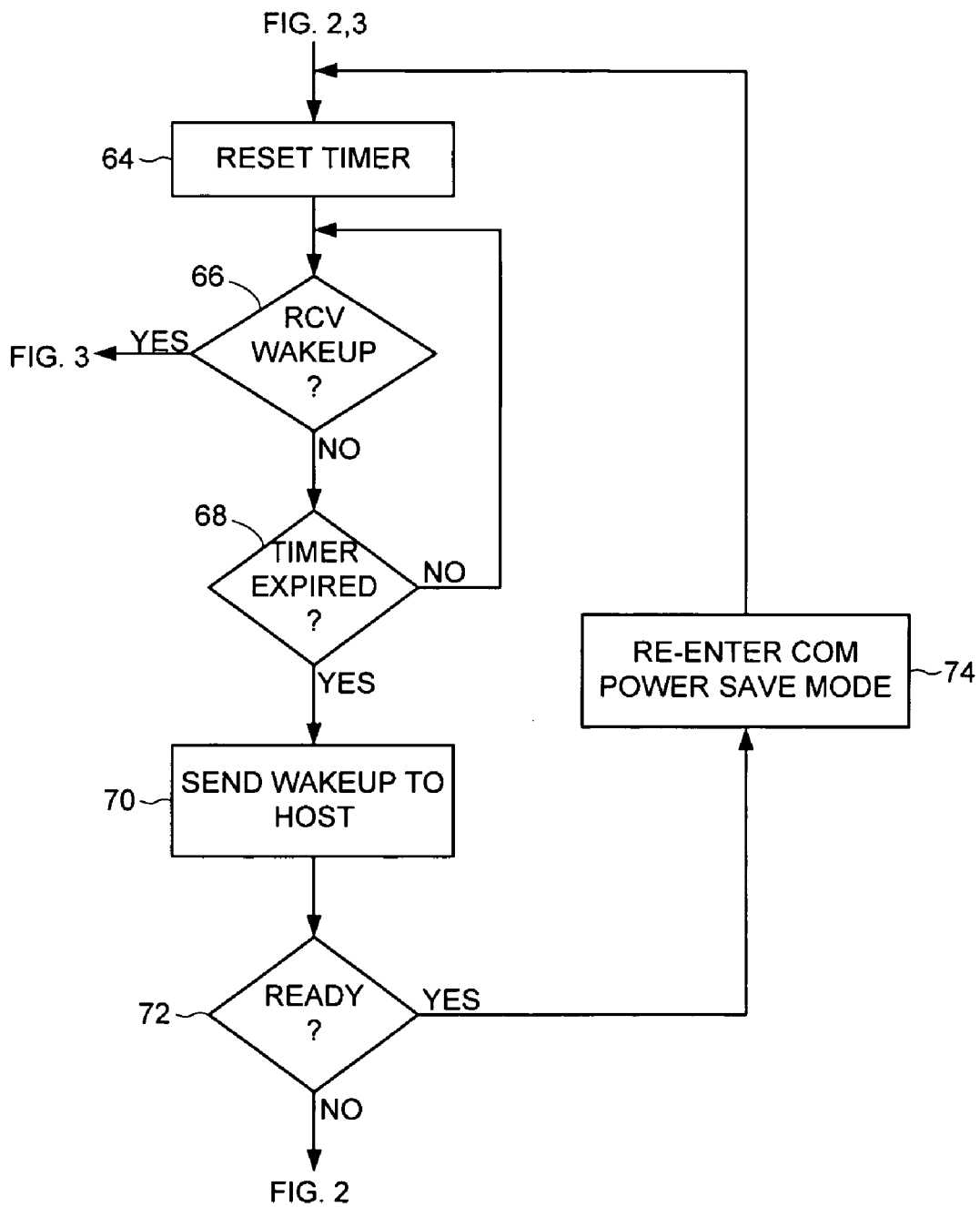
FIG. 4 is a flow diagram illustrating how the control circuitry periodically awakens from a communication power save mode to detect and log a cable loss event according to an embodiment of the present invention.

FIG. 4 is a flow diagram illustrating the communication power save mode that may be initiated either by the disk drive 2 or the host 12 if, for example, there has been a long interval since processing the last disk access command. In this embodiment, the control circuitry 16 periodically awakens from the communication power save mode in order to check whether the cable 14 is still connected. At step 64 a timer is reset for timing the periodic interval for waking from the communication power save mode. If at step 66 the disk drive 2 receives a wakeup command from the host 12, then control proceeds to the normal operating mode of FIG. 3. If a wakeup command is not received from the host 12 at step 66, and at step 68 the timer expires, then at step 70 the control circuitry 16 transmits a wakeup command to the host 12. If at step 72 the control circuitry 16 receives a ready status from the host, then at step 74 the control circuitry 16 re-enters the communication power save mode, and re-executes the flow diagram of FIG. 4. If at step 72 the control circuitry 16 does not receive a ready status from the host 12, then control proceeds to step 28 or 30 of FIG. 2 in order to detect whether a cable loss event has occurred.

In one embodiment, a single NO_CABLE or CABLE_LOSS event is logged for each power on cycle of the disk drive 2. In another embodiment, the NO_CABLE and CABLE_LOSS events are logged whenever they are detected, including if multiple events occur during a single power on cycle of the disk drive. Thus, when the flow diagram of FIG. 2 is re-executed from the normal operating mode of FIG. 3 or the communication power saving mode of FIG. 4, execution may begin at either step 28 or 30, as indicated by the dashed lines.

In one embodiment, the NO_CABLE and CABLE_LOSS events are stored in an event log that is saved in a non-volatile memory, such as a non-volatile semiconductor memory included in the control circuitry 16 or on the disk 2. In this manner, when the disk drive 2 is returned to the manufacture for diagnostics, the event log can be retrieved and evaluated.

Executing the communication process at least twice before detecting and logging a NO_CABLE or CABLE_LOSS event helps minimize the number of false events detected. In other words, a single communication failure may be due to a transient event other than a bad cable connection, such as electrical noise or interference in the communication circuitry or cable 14. However, if the communication process fails multiple times, it is more likely due to a bad cable connection rather than any other factor. The threshold at step 24 of FIG. 1B may be set to any suitable value so that the communication process is executed a sufficient number of times before a NO_CABLE or CABLE_LOSS event is logged. A higher threshold helps filter out false positives, but increases the probability of missing minor cable problems. In one embodiment, a nominal threshold is determined for a family of disk drives that provides the most reliable indication of a faulty cable connection.

We claim:

1. A disk drive comprising:
   (a) a disk;
   (b) a head actuated over the disk;
   (c) an interface operable to connect to a host through a cable; and
   (d) control circuitry operable to:
      attempt to communicate with the host over the cable by executing a communication process comprising the steps of transmitting a communication request to the host over the cable and waiting to receive a response from the host over the cable; and
      log a cable loss event if the host fails to respond after executing the communication process at least twice.

2. The disk drive as recited in claim 1, wherein the cable is a serial advanced technology attachment (SATA) cable.

3. The disk drive as recited in claim 1, wherein the control circuitry is further operable to periodically execute the communication process.

4. The disk drive as recited in claim 1, wherein the control circuitry is further operable to:
   (a) enter a communication power save mode;
   (b) awaken from the communication power save mode to execute the communication process; and
   (c) re-enter the communication power save mode.

5. The disk drive as recited in claim 1, wherein the cable loss event comprises a cumulative operating time of the disk drive.

6. The disk drive as recited in claim 1, wherein the cable loss event comprises a power cycle count of the disk drive.

7. The disk drive as recited in claim 1, wherein the control circuitry is further operable to store a plurality of cable loss events in an event log saved in a non-volatile memory.

8. The disk drive as recited in claim 7, wherein the non-volatile memory comprises the disk.

9. A method of operating a disk drive coupled to a host through a cable, the disk drive comprising a disk and a head actuated over the disk, the method comprising the steps of:
   (a) attempting to communicate with the host over the cable by executing a communication process comprising the steps of transmitting a communication request to the host over the cable and waiting to receive a response from the host over the cable; and
   (b) logging a cable loss event if the host fails to respond after executing the communication process at least twice.

10. The method as recited in claim 9, wherein the cable is a serial advanced technology attachment (SATA) cable.

11. The method as recited in claim 9, further comprising the step of periodically executing the communication process.

12. The method as recited in claim 9, further comprising the steps of:
   entering a communication power save mode;
   awakening from the communication power save mode to execute the communication process; and
   re-entering the communication power save mode.

13. The method as recited in claim 9, wherein the cable loss event comprises a cumulative operating time of the disk drive.

14. The method as recited in claim 9, wherein the cable loss event comprises a power cycle count of the disk drive.

15. The method as recited in claim 9, further comprising the steps of storing a plurality of cable loss events in an event log, and saving the event log in a non-volatile memory.

16. The method as recited in claim 15, wherein the non-volatile memory comprises the disk.

17. A serial attached device comprising:
   (a) an interface operable to connect to a host through a serial cable; and
   (b) control circuitry operable to:
      attempt to communicate with the host over the serial cable by executing a communication process comprising the steps of transmitting a communication request to the host over the cable and waiting to receive a response from the host over the cable; and
      log a cable loss event if the host fails to respond after executing the communication process at least twice.

18. The serial attached device as recited in claim 17, wherein the control circuitry resides in an information storage device.

19. The serial attached device as recited in claim 18, wherein the information storage device comprises a disk drive.

20. The serial attached device as recited in claim 18, wherein the information storage device comprises a FLASH memory.

21. The serial attached device as recited in claim 17, wherein the serial cable is a serial advanced technology attachment (SATA) cable.

22. The serial attached device as recited in claim 17, wherein the serial cable is a serial attached SCSI (SAS) cable.

23. The serial attached device as recited in claim 17, wherein the control circuitry is further operable to periodically execute the communication process.

24. The serial attached device as recited in claim 17, wherein the control circuitry is further operable to:
(a) enter a communication power save mode;
(b) awaken from the communication power save mode to execute the communication process; and
(c) re-enter the communication power save mode.

25. The serial attached device as recited in claim 17, wherein the cable loss event comprises a cumulative operating time of the serial attached device.

26. The serial attached device as recited in claim 17, wherein the cable loss event comprises a power cycle count of the serial attached device.

27. The serial attached device as recited in claim 17, wherein the control circuitry is further operable to store a plurality of cable loss events in an event log saved in a non-volatile memory.

* * * * *